United States Patent [19]

Yamada et al.

[11] Patent Number: 4,734,467

[45] Date of Patent: Mar. 29, 1988

[54] COIL COATING PAINT COMPOSITION

[75] Inventors: Mitsuo Yamada, Osaka; Hirotoshi Umemoto, Kyoto; Hiromichi Tamasaki, Osaka, all of Japan

[73] Assignee: Nippon Paint Co., Ltd., Osaka, Japan

[21] Appl. No.: 893,637

[22] Filed: Aug. 7, 1986

[51] Int. Cl.[4] .............................................. C08L 67/00
[52] U.S. Cl. .................................... 525/440; 525/437; 525/441; 525/443; 525/444
[58] Field of Search ............... 525/440, 443, 444, 415, 525/437, 441

[56]  References Cited

U.S. PATENT DOCUMENTS

| | | | |
|---|---|---|---|
| 4,140,729 | 2/1979 | Tobias et al. | 525/443 X |
| 4,405,764 | 9/1983 | Tobias et al. | 525/443 |
| 4,424,296 | 1/1984 | Antonelli | 524/539 |

*Primary Examiner*—Theodore E. Pertilla
*Attorney, Agent, or Firm*—Wenderoth, Lind & Ponack

[57] ABSTRACT

A coil coating composition consisting essentially of (A) a binder component comprising a mixture of a linear polyester resin and a branched polyester resin, having a hydroxyl value of 40 to 90, and (B) a crosslinking component selected from melamine resin, at least part of which is methyl methylolated melamine, or isocyanate compound. Said polyester resins are herein defined. The coating composition is useful in a coil coating and results in a coating with excellent properties in respect of hardness, bending processability, fastness to boiling water, weather resistance, chemical resistance, marker stain resistance and the like.

2 Claims, No Drawings

COIL COATING PAINT COMPOSITION

FIELD OF THE INVENTION

The present invention relates to a coil coating paint composition. More specifically, the invention concerns a high solids coating composition for coil coating use, capable of forming a coating with excellent properties in respect of hardness, bending processability, fastness to boiling water, weather resistance, chemical resistance, marker stain resistance and the like.

BACKGROUND OF THE INVENTION

As a coating composition to be used in a coil coating of steel plate and the like, various properties including excellent weather resistance, chemical resistance, water resistance, coin scratch resistance, gloss, hardness, and bending properties of the coating, as well as the capability of formulating a high solids paint, are important.

In such application, a polyester resin is a promising material because of resulting in a coating with excellent weather resistance, chemical resistance, hardness and the like. However, this material has a serious drawback of lacking in structural flexibility. As an attempt for giving stretchability and flexibility to a polyester resin, there has been proposed a technique wherein a comparatively long methylene chain is included in either of dicarboxylic acid or diol component or in lactone to be reacted with polyester resin, thereby introducing the same into the polyester's molecular structure. However, hardness and bending properties are, in principle, contrary to each other, and an improvement in flexibility is always linked with a decrease in hardness. Thus, it is quite difficult to attain the well balanced flexibility and hardness in a single polyester resin.

It has also been proposed to use a mixture of soft polyester and hard polyester as a binder resin (Japanese Patent Application Kokai No. 111864/83, ibid 111865/83). In these attempts, while maintaining each of hardness, water resistance and chemical resistance at an appropriate level, success was attained in having an improved flexibility, rubber-like elasticity and the like by the control of methylene chain content of the resinous composition, but it was only accomplished to the satisfaction of the desired properties of the coating on soft materials such as fender, bumper and the like. The proposed coating compositions were of quite dissatisfactory when used as a coil coating of steel plate, especially with respect to hardness, bending properties and the like.

Recently, a very attractive lacquer type coil coating paint composition has been proposed in Japanese Patent Application Kokai No. 210975/84, in which a linear polyester resin having a number average molecular weight of 15,000 to 50,000 and a linear or branched polyester resin having a number average molecular weight of 2,000 to 10,000 are mixed in a weight ratio of 80:20 to 20:80 and used as a resinous binder. This composition is said to give a coating with well balanced hardness and bending processability.

However, since the coating composition does not include any crosslinking agents, the thus formed coating is insufficient in weather resistance, fastness to boiling water, chemical resistance and the like. Even if an attempt is made to blend a crosslinking agent with said coating composition, an additional problem of poor compatibility would inevitably arise from the high molecular weight of the polyester resin used.

Therefore, the application of said lacquer type paint composition is in fact confined in limited areas.

An object of the present invention is therefore to provide a polyester binder which is compatible with a crosslinking agent. An additional object of the invention is to provide a coating composition for coil coating use, which will give a coating with well balanced hardness and bending processabilities, as well as the characteristic properties possessed by polyester resin, and capable of being formulated as a high solids paint.

The inventors, as the results of extensive studies, have found that if a melamine resin at least part of which is methyl methylolated melamine (e. g. methylol melamine methyl ether alone or a mixture of methylol melamine methyl ether and methylol melamine butyl ether) or an isocyanate compound is selected as a crosslinking agent and a combination of low molecular weight (up to number average molecular weight 5000) linear polyester and a branched polyester is used as binder resins, a compatible blend can be formulated and a high solids coating composition capable of resulting in a coating with well balanced hardness and bending processability can be obtained. On the basis of these findings, the present invention has been made.

Thus, according to the invention, there is provided a coating composition for coil coating use consisting essentially of (a) a binder component comprising a mixture of a linear polyester resin and a branched polyester resin, having a hydroxyl value of 40 to 90, said linear polyester resin being composed of polybasic acid component and polyhydric alcohol component consisting of trihydric and/or polyhydric alcohol (0 to 10 wt% of the solid matter) and dihydric alcohol and having 1.8 to 2.2 hydroxyl groups per molecule and a number average molecular weight of 1000 to 5000, and said branched polyester resin being composed of polybasic acid component and polyhydric alcohol component consisting of trihydric and/or tetrahydric alcohol (3 to 40 weight% of the solid matter) and dihydric alcohol, and having 2.3 to 4.5 hydroxyl groups per molecule, and (b) a crosslinking component consisting of melamine resin, at least part of which is a methyl methylolated melamine, or isocyanate compound.

The first polyester resin used in the present invention is an oil-free linear polyester resin composed of polybasic acid component and polyhydric alcohol component, the polyhydric alcohol component consisting of substantial amount of dihydric alcohol and a small amount (0 to 10 weight % of the solid matter) of trihydric and/or tetrahydric alcohol, having 1.8 to 2.2 hydroxyl groups per molecule and a number average molecular weight 1000 to 5000.

By the employment of this type of polyester resin, entanglement of resinous molecules and physical crosslinking are of use in giving improved hardness, weather resistance and fastness to boiling water of the coating, and easy unraveling properties of the entangled molecules, sliding properties and stress relaxation are believed to be of use in giving improved bending properties and low temperature impact strength. When the hydroxyl groups are less than 1.8 per molecule, there remains a considerable number of unreacted chains, which will cause a decrease in weather resistance of the coating, whereas if the hydroxyl groups exceed 2.2 per molecule, there will be a decrease in sliding properties and hence the desired bending properties.

The number average molecular weight of said linear polyester resin should be in a range of 1000 to 5000, and preferably 2000 to 4000. This is because, in the combination of said resin with the specified crosslinking agent and branched polyester resin, if the number average molecular weight of said linear polyester is less than 1000, the desired bending processability cannot be expected, and if it exceeds 5000, it is unable to have a high solids coating composition and the desired compatibility with the selected crosslinking agent.

The second polyester resin used in the present invention is a branched, oil-free polyester resin composed of polybasic acid component and polyhydric alcohol component consisting of trihydric and/or tetrahydric alcohol, the hydroxyl groups number per molecule being 2.3 to 4.5. By the selective use of this type of branched polyester resin, hardness, weather resistance and fastness of boiling water of the coating are greatly improved because of the increase in chemical crosslinking between the functional groups contained therein.

If the hydroxyl group number is less than 2.3, it is unable to obtain the desired hardness and weather resistance of the coating, whereas the preparation of branched polyester resin having more than 4.5 hydroxyl groups per molecule is very difficult to do.

In the present invention, the abovementioned linear polyester resin and branched polyester resin are mixed together so as to give a hydroxyl value of 40 to 90. This is because, if the hydroxyl value of the mixed resin is less than 40, the formed coating is too soft to achieve the objects of the invention, and if it exceeds 90, the coating is too hard.

As to the number average molecular weight of said branched polyester resin, it is not so critical to the objects of the invention and is appropriately selected in a common range of about 800 to 4000.

The present branched polyester resin may be modified with a lactone of the formula:

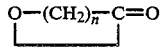

wherein n is an integer of 4 to 10, thereby giving softness to the branched polyester resin and increasing crosslinking density of the cured coating, if desired. Said lactone may be used in an amount of 0 to 40 weight% of the resin solid.

Furthermore, in the present invention, either or both of the abovementioned linear and branched polyester resins may be modified with an alkyleneimine such as, for example, N-(2-hydroxy ethyl)ethyleneimine (HEEI) to improve pigment dispersion properties of the resin composition.

As already stated, the most characteristic feature of the invention resides in the point that the abovementioned resin composition is used as a binder component together with a crosslinking agent selected from the group consisting of a melamine resin at least part of which is methyl methylolated melamine, and an isocyanate compound.

Contrary to our expectations, the number average molecular weight of the linear polyester resin to be blended with a branched polyester resin could be markedly lowered when the abovesaid particular compound was selectively used as a crosslinking agent.

At present, the exact reasons have not been fully understood, but the following are presumed to be one of the grounds thereof.

That is, when said crosslinking agent is selected, differing from the case with butylated melamine, the self condensation of the crosslinking agent is prevented and the resin and the crosslinking agent are reacted with each other in alternative order to give a soft, cured coating.

Lowering of the molecular weight of the polyester resin contributes to the improvement in the compatibility of said resin with a crosslinking agent and to the formation of a high solids coating composition. Employment of said polymer blend can result in well balanced properties of hardness and bending processability, and employment of said crosslinking agent by far improves in weather resistance, fastness to boiling water, chemical resistance and marker stain resistance of the coating. Thus, the present composition is very useful as a resinous vehicle of a coil coating paint composition.

As to the blending ratio of the abovementioned polyester resins, it is selected in a wide range depending on the application desired. The polyester blend is preferably compounded with the abovementioned crosslinking agent in a weight ratio (as solid) of 5/95 to 50/50, most preferably 20/80 to 35/65.

The present coating composition is usually applied on a steel plate or the like by coil coating means and baked, in most cases, at 180° to 250° C. for 30 seconds to 2 minutes to give a coating with excellent properties with respect to hardness, bending properties, weather resistance, gloss, coin scratch resistance, fastness to boiling water, chemical resistance and marker stain resistance.

The invention shall be now more fully explained in the following Examples. Unless otherwise stated, all parts and % are by weight.

SYNTHETIC EXAMPLE 1

Preparation of linear polyester resin (A)

Into a 2 liter reaction vessel fitted with a stirrer, a fractionating column, a nitrogen gas inlet tube and a thermometer, were placed 140.9 parts of terephthalic acid, 495.5 parts of adipic acid, 135.9 parts of ethyleneglycol, 227.8 parts of neopentylglycol and 2 parts of dibutyl tin oxide and the mixture was heated. At the stage when it reached a stirrable condition, stirring was commenced and the temperature was raised to 240° C. At that time, from 160° C. to 240° C., the temperature was raised at a constant speed in 3 hours. The reaction water formed was continuously distilled off through the fractionating column out of the system. When the temperature reached 240° C., the mixture was maintained at said temperature and stirred for 1 hour. Thereafter, the fractionating column was stopped working, xylene was added and the mixture was further reacted under refluxing conditions. When the acid value of the reaction product reached about 2.0, the reaction was stopped and the mixture was allowed to cool. After cooling, 214 parts of xylene and 214 parts of Cellosolve acetate were added to obtain an oil-free polyester resin solution A-1. Analysis showed that it had a solid content of 70.4%, a viscosity (Gardner bubble viscometer, 25° C.) of Y and contained polyester resin having a number average molecular weight of 5,000, a hydroxyl value of 21, an average number of hydroxyl groups per molecule of 1.8 and an acid value of 2.1.

SYNTHETIC EXAMPLES 2 TO 5

Following the procedures of Synthetic Example 1 but using the materials shown in Table 1, various linear polyester resins were prepared. However, in these Examples, a light modification was made as follows. That is, in the cases of the resins A-④ and A-⑤, the condensation reactions were stopped at the stage when the acid value (AV/NV) reached 7.0 and 5.0, respectively, and the reaction mixture was allowed to cool to 90° C. While keeping the temperature at 90° C., 7.0 parts (in the case of A-④) and 4.3 parts (in the case of A-⑤) of N-(2-hydroxyethyl)ethyleneimine (HEEI) were added and the mixtures were reacted for 1 hour and then diluted with a mixture of 269 parts of xylene and 269 parts of Cellosolve acetate, respectively. The characteristics of these resin varnishes are shown in Table 1.

SYNTHETIC EXAMPLE 6

Preparation of branched polyester resin (B)

Into a similar reaction vessel as used in Synthetic Example 1, were placed 373.9 parts of isophthalic acid, 85.6 parts of hexahydrophthalic anhydride, 94.6 parts of 1,6-hexanediol, 81.1 parts of neopentylglycol, 103.6 parts of trimethylol propane, 229.7 parts of Cardula E-10, and 2 parts of dibutyl tin oxide and the mixture was heated. At the stage when it reached a stirrable condition, stirring was commenced and the temperature was raised to 230° C. At that time, from 195° C. to 230° C., temperature was raised at a constant speed in 2 hours. Thereafter, the reaction was continued as in Synthetic Example 1 until the acid value of the reaction product reached about 3.0. After cooling to 150° C., the mixture was added with 31.5 parts of phthalic anhydride and reacted to obtain an oil-free polyester resin solution. The characteristics of thus obtained varnish are shown in Table 1.

SYNTHETIC EXAMPLE 7

Into a similar reaction vessel as used in Synthetic Example 1, were placed 274.0 parts of isophthalic acid, 255 parts of hexahydrophthalic anhydride, 178.3 parts of 1,6-hexanediol, 157.1 parts of neopentylglycol, 61.5 parts of trimethylol propane, 73.8 parts of caprolactam and 2.0 parts of dibutyl tin oxide and the mixture was reacted as in Synthetic Example 1 until the resinous acid value reached about 15. After cooling, the mixture was added with 269 parts of xylene and 269 parts of Cellosolve acetate to obtain a resin varnish. The characteristics of thus obtained varnish are shown in Table 1.

SYNTHETIC EXAMPLE 8

Repeating the same procedures as stated in Synthetic Example 7 but using the materials shown in Table 1, an oil-free polyester resin varnish was prepared, whose characteristics are also shown in Table 1.

SYNTHETIC EXAMPLE 9

Into a similar reaction vessel as used in Synthetic Example 1, were placed 288.1 parts of isophthalic acid, 67.1 parts of hexahydro phthalic anhydride, 94.6 parts of neopentylglycol, 124.9 parts of trimethylolpropane, 182.9 parts of Cardula E-10 and 207.2 parts of ε-caprolactam and the mixture was reacted as in Synthetic Example 1. As soon as the resinous acid value reached about 7.0, the reaction was stopped and the reaction mixture was allowed to cool to 140° C. 35.3 parts of phthalic anhydride were added and the mixture was further reacted to obtain an oil-free polyester resin varnish. The characteristics of thus obtained varnish are shown in Table 1.

SYNTHETIC EXAMPLES 10 TO 12

Repeating the same procedures as stated in Synthetic Example 1 but using the materials shown in Table 1, branched polyester resin varnishes were prepared. The characteristics of thus obtained varnishes are shown in Table 1.

SYNTHETIC EXAMPLE 13

Preparation of Comparative resin varnish C- ⑬

Into 2 liter reaction vessel which was similar to that of Synthetic Example 1 and was connected to a vacuum pump, were placed 244.9 parts of terephthalic acid, 244.9 parts of isophthalic acid, 298.3 parts of sebacic acid, 138.4 parts of ethyleneglycol, 232.4 parts of neopentylglycol, 2 parts of dibutyl tin oxide and 2 parts of antimony trioxide and the mixture was reacted at 170° to 250° C. After completion of the esterification reaction, polycondensation reaction was carried out under reduced pressure of 0.5 to 1.0 mmHg to obtain a high molecular weight linear polyester resin. The characteristics of thus obtained resin varnish are shown in Table 1.

SYNTHETIC EXAMPLE 14

Preparation of Comparative resin varnish C- ⑭

Repeating the same procedures as stated in Synthetic Example 1 but using the materials shown in Table 1, a low molecular weight linear polyester resin varnish was prepared. The characteristics of said resin varnish are shown in Table 1.

SYNTHETIC EXAMPLE 15

Preparation of Comparative resin varnish C- ⑮

Repeating the same procedures as stated in Synthetic Example 1 but using the materials shown in Table 1, a linear polyester resin varnish was prepared. The characteristics of thus obtained varnish are shown in Table 1.

SYNTHETIC EXAMPLES 16 AND 17

Preparation of Comparative resin varnishes C- ⑯ and C- ⑰

Repeating the same procedures as stated in Synthetic Example 1 but using the materials shown in Table 1, branched polyester reisn varnishes were prepared. The characteristics of these varnishes are shown in Table 1.

In the following Example, a number average molecular weight of a polyester resin is calculated by the equation: (as prescribed in "A guide to synthetic resins for coating use" written by Kyozo Kitaoka, published by High Molecular Publishing Associate, page 101)

$$M_n = \frac{W}{(ma + mb) - \left(1 - \frac{\alpha}{100}\right) ea_2 - ea_1 + \frac{W - AV}{56100}}$$

wherein
- α: intramolecular reaction rate % (in case of phthalic anhydride ... 4.0)
- W: weight of final resin
- ma: number of moles of acid in the final resin
- mb: number of moles of alcohol charged
- $ea_2$: equivalent of acid charged
- $ea_1$: equivalent of monobasic acid charged AV: acid value of final resin

EXAMPLE 1

A coil coating composition was prepared by kneading the following mixture in a ball mill for 24 hours.

The oil-free polyester resins A-①  and B-⑥ used are shown in Synthetic Examples 1 and 6 respectively.

| Formulation: | |
|---|---|
| 70.4% linear polyester resin A-① | 71.4 parts |
| 65.0% branched polyester resin B-⑥ | 76.9 |
| 80% methyl methylolated melamine[1] | 37.5 |
| titanium oxide[2] | 100.0 |
| p-toluene sulfonic acid solution[3] | 6.5 |
| Modaflow[4] | 0.3 |
| n-butanol | 15.0 |
| Total | 307.6 |

[1] Sumimal M-40S, non-volatile content 80%, trade mark, Sumitomo Chem. Co.
[2] Titanium CR-91, trade mark, Ishihara Sangyo
[3] 20 wt % benzylalcohol solution
[4] trade mark, Monsanto Chem. Co.

Thus obtained composition was added with a dilution thinner: 1:1 (by weight)=Solvesso 150:Isophorone to give a diluted composition having a viscosity of 120 seconds (Ford Cup #4, at 20° C.).

The diluted coating composition was then applied on a galvanized steel having a thickness of 0.3 mm (JIS-G3302) previously treated with a zinc phosphate solution, to give a wet film thickness of 10 to 15μ and the coated steel plate was baked at 230° C. for 40 seconds.

The following tests were carried out with the coating composition and with the coated plate.

(1) non-volatile content (%) of the coating composition

A coating composition was diluted with a mixed dilution thinner (isophorone/Solvesso #150=1/1 wt/wt) to a viscosity (#4 Ford cup, at 25° C.) of 120 seconds, An amount of said composition was taken and weighed, and after being subjected to drying at 105° C. for 3 hours, the residual amount was again weighed and non-volatile content of said composition was calculated therefrom.

(2) gloss

60° reflection factor was determined by using Murakami type GM-3H glossmeter.

(3) Pencil hardness

Pencil hardness was determined by using a high quality pencil prescribed by JIS-S-6006 and following a standardized method of JIS-K-5400

(4) bending properties

A coated steel was folded at 180° and cracking behavior at the bended portion was observed.

2T, for example, stands for no cracking when two coated plates having the same thickness are bended together.

(5) fastness to boiling water

A coated plate was dipped in boiling water for 8 hours, and the coating was then observed.

O ... good; X ... no good (generation of blister)

(6) chemical resistance 0.5 cc of 10% aq. $H_2SO_4$ solution was dropped on a coated surface and the plate was maintained at 20° C. and under 75% relative humidity (RH) condition for 24 hours.

Thereafter, the coating was washed with water and chemical resistance of the coating was determined.

O ... good; X ... no good (7) marker stain resistance

A red colored oil ink was applied on the coating (in 0.5×2 cm area) and after leaving it at 20° C. for 24 hours, the inked area was scrubbed with a gauze impregnated with methanol and observed for the degree of stain O ... good; X ... no good (8) weather resistance Gloss retention (%) was measured after 2000 hours' irradiation in Sunshine weather-O-meter.

The test results are shown in Table 2.

EXAMPLE 2 AND 3

Using the linear polyester resins A-② and A-③ and the branched polyester resins B-⑦ and B-⑧, the same procedures as stated in Example 1 were repeated to obtain coating compositions. The respective coating composition was diluted, applied on the similar galvanized steel, baked and tested as in Example 1.

The test results are shown in Table 2.

EXAMPLE 4

A coil coating composition was prepared by using the oil-free polyester resin A-④ and B-⑨ obtained in Synthetic Examples 4 and 9, and following the dispersion formulation (1) and solution formulation (2) hereinunder stated.

| Dispersion formulation (1) | |
|---|---|
| 65.2% linear polyester resin A-④ | 46.2 parts |
| titanium oxide | 100.0 |
| n-butanol | 15.0 |
| Total | 161.2 |
| Solution formulation (2) | |
| Dispersion paste | 161.2 parts |
| (of dispersion formulation (1)) | |
| 65.0% branched polyester resin B-⑨ | 108 |
| 80% methyl methylolated melamine | 37.5 |
| p-toluene sulfonic acid solution | 6.5 |
| Modaflow | 0.3 |
| Total | 273.0 |

Thus obtained coating composition was diluted, applied on a galvanized steel previously treated with a zinc phosphate solution and baked as in Example 1.

The same tests as stated in Example 1 were carried out and the test results are shown in Table 2.

EXAMPLES 5 AND 6

Using the oil-free polyester resins A-④ and B-⑩ obtained in Synthetic Examples 4 and 10 in Example 5, and the oil-free polyester resins A-⑤ and B-⑧ obtained in Synthetic Examples 5 and 8 in Example 6, the same procedures as stated in Example 4 were repeated to obtain coating compositions. They were diluted, applied on galvanized steel plates previously treated with a zinc phosphate solution, baked and tested as in Example 1. The test results are shown in Table 2.

EXAMPLES 7 AND 8

Using the oil-free polyester resins A-② and B-⑪ obtained in Synthetic Examples 2 and 11 in Example 7 and the oil-free polyester resins A-③ and B-⑫ obtained in Synthetic Examples 3 and 12 in Example 8, together with an amount of methyl methylolated melamine shown in Table 2, the same procedures as stated in Example 1 were repeated to obtain coating compositions. They were diluted, applied on galvanized steel plates previously treated with a zinc phosphate solution, baked and tested as in Example 1. The test results are shown in Table 2.

EXAMPLE 9

A coil coating composition was prepared by using the oil-free polyester resins A-① and B-⑥ obtained in Synthetic Examples 1 and 6 and following the prescription mentioned below:

| | |
|---|---|
| 70.4% linear polyester resin A-① | 85.2 parts |
| 65.0% branched polyester resin B-⑥ | 61.5 |
| 80% methyl methylolated melamine | 26.3 |
| 60% butyl methylolated melamine[1] | 15 |
| titanium oxide | 100 |
| p-toluene sulfonic acid solution | 3.0 |
| Modaflow | 0.3 |
| n-butanol | 15.0 |
| Total | 306.3 |

[1]Super Beckamine J-820-60, trade mark, Dainippon Ink Chem. Ind. Ltd., non-volatile content 60%

Thus obtained coating composition was diluted, applied on a galvanized steel plate previously treated with a zinc phosphate solution, baked and tested as in Example 1. The test results are shown in Table 2.

EXAMPLE 10

Using the oil-free polyester resins A-② and B-⑦ obtained in Synthetic Examples 2 and 7 and the melamine resins shown in Example 9, the same procedures as stated in Example 9 were repeated to obtain a coating composition. The composition was diluted, applied on a galvanized steel plate previously treated with a zinc phosphate solution, baked and tested as in Example 1.

The test results are shown in Table 2.

EXAMPLE 11

A coil coating composition was prepared by using the oil-free polyester resins A-② and B-⑪ obtained in Synthetic Examples 2 and 11 and following the prescriptions shown below.

| | |
|---|---|
| Dispersion formulation (1) | |
| 70.2% linear polyester resin A-② | 42.7 parts |
| titanium oxide | 100.0 |
| Total | 142.7 |
| Solution formulation (2) | |
| Dispersion paste (of dispersion formulation (1)) | 142.7 parts |
| 70.2% linear polyester resin A-② | 71.2 |
| 65.2% branched polyester resin B-⑪ | 30.7 |
| Sumidule N-75[1] | 16.0 |
| dibutyl tin dilaurate | 0.02 |
| Modaflow | 0.5 |
| Total | 261.1 |

[1]75% aliphatic polyisocyanate in 1:1 Cellosolve acetate/xylene, trade mark, Sumitomo Bayer Urethane K.K.

Thus obtained coating composition was diluted, applied on a galvanized steel plate previously treated with a zinc phosphate solution, baked and tested as in Example 1.

The test results are shown in Table 2.

COMPARATIVE EXAMPLES 1 TO 9

Comparative coating compositions 1 to 9 were prepared by using the same procedures as stated in Example 1 and the materials shown in Table 2. They were diluted, applied on a galvanized steel plate previously treated with a zinc phosphate solution, baked and tested as in Example 1. The test results are also shown in Table 2.

TABLE 1

| | linear type polyester resin | | | | | branched type polyester resin | | | | |
|---|---|---|---|---|---|---|---|---|---|---|
| Synthetic Example | 1 | 2 | 3 | 4 | 5 | 6 | 7 | 8 | 9 | 10 |
| oil-free polyester resin | A-① | A-② | A-③ | A-④ | A-⑤ | B-⑥ | B-⑦ | B-⑧ | B-⑨ | B-⑩ |
| Composition and characteristics | | | | | | | | | | |
| resin raw materials | | | | | | | | | | |
| 1. terephthalic acid | 140.9 | 373.0 | 137.1 | | | | | | | |
| 2. isophthalic acid | | | | 154.7 | 195.7 | 373.9 | 274.0 | 455.5 | 288.1 | 205.7 |
| 3. phthalic anhydride | | | | 341.5 | 220.7 | | | | | |
| 4. adipic acid | 495.5 | | 482.5 | 85.0 | 122.3 | | | | | 120.6 |
| 5. azelaic acid | | 147.0 | | | | | | | | |
| 6. sebacic acid | | 147.0 | | | | | | | | |
| 7. hexahydro phthalic anhydride | | | | | | 85.6 | 255.2 | | 67.1 | |
| 8. ethyleneglycol | 135.9 | 124.0 | 91.1 | | | | | | | |
| 9. 1,4-butanediol | | | 132.1 | | | | | | | |
| 10. 1,6-hexanediol | | | | 242.0 | 94.6 | 178.3 | 119.9 | | | |
| 11. neopentyl glycol | 227.8 | 209.0 | 153.2 | 348.8 | 176.0 | 81.1 | 157.1 | 160.0 | 94.6 | 156.6 |
| 12. trimethylol propane | | | 4.0 | 77.8 | 43.3 | 103.6 | 61.5 | 52.1 | 124.9 | 116.8 |
| 13. pentaerythritol | | | | | | | | | | |
| 14. Cardura E-10 | | | | | | 229.7 | | | 182.9 | |
| 15. ε-caprolactone (n = 5) | | | | | | | 73.8 | 212.5 | 207.2 | 400.0 |
| 16. phthalic anhydride (for later charge) | | | | | | 31.5 | | | 35.3 | |
| 17. 2-hydroxyethyl ethyleneimine (HEEI) | | | | 7.0 | 4.3 | | | | | |
| resin specifications | | | | | | | | | | |
| a. number average molecular weight | 5,000 | 3,000 | 2,500 | 2,000 | 1,200 | 1,800 | 2,200 | 3,000 | 1,900 | 2,000 |
| b. OH value | 21 | 35 | 45 | 62 | 94 | 91 | 64 | 55 | 93 | 98 |
| c. average OH number per molecule | 1.8 | 1.9 | 2.0 | 2.2 | 2.0 | 3.0 | 2.5 | 2.9 | 3.2 | 3.5 |
| d. trivalent/tetravalent alcohol (wt %) | 0 | 0 | 0.4 | 7.8 | 4.3 | 10.4 | 6.2 | 5.2 | 12.5 | 11.7 |
| e. ε-caprolactone (wt %) | — | — | — | — | — | 0 | 7.4 | 21.2 | 20.7 | 40.0 |
| characteristics of resin | | | | | | | | | | |
| A. non-volatile content (%) | 70.4 | 70.2 | 69.8 | 65.2 | 65.0 | 65.1 | 64.8 | 65.2 | 65.0 | 65.1 |
| B. viscosity (25° C. Gardner) | Y | $Z_1$ | Y | XY | T | Y < Z | $Z_1 < Z_2$ | W-X | Y | XY |
| C. acid value (AV/NV) | 2.1 | 2.0 | 2.0 | 2.1 | 2.2 | 15.0 | 15.1 | 7.3 | 20.2 | 10.0 | branched type polyester resin    comparative resin

TABLE 1-continued

| Synthetic Example | 11 | 12 | 13 | 14 | 15 | 16 | 17 |
|---|---|---|---|---|---|---|---|
| oil-free polyester resin | B-⑪ | B-⑫ | C-⑬ | C-⑭ | C-⑮ | C-⑯ | C-⑰ |
| Composition and characteristics | | | | | | | |
| resin raw materials | | | | | | | |
| 1. terephthalic acid | | | 244.9 | | | | |
| 2. isophthalic acid | 303.9 | 365.6 | 244.9 | 317.0 | 284.6 | 166.5 | 247.6 |
| 3. phthalic anhydride | | | | | 104.9 | | 147.2 |
| 4. adipic acid | 178.2 | 214.4 | | 278.9 | 250.4 | 97.6 | 145.2 |
| 5. azelaic acid | | | | | | | |
| 6. sebacic acid | | | 298.3 | | | | |
| 7. hexahydro phthalic anhydride | | | | | | | |
| 8. ethyleneglycol | | | 138.4 | 150.8 | 134.3 | | |
| 9. 1,4-butanediol | | | | | | | |
| 10. 1,6-hexanediol | 62.8 | 207.3 | | | | | |
| 11. neopentyl glycol | 55.4 | 182.8 | 232.4 | 253.4 | 225.8 | 114.7 | 100.2 |
| 12. trimethylol propane | 399.7 | 30.0 | | | | 118.6 | 113.7 |
| 13. pentaerythritol | | | | | | | 246.1 |
| 14. Cardura E-10 | | | | | | | |
| 15. ε-caprolactone (n = 5) | | | | | 502.7 | | |
| 16. phthalic anhydride (for later charge) | | | | | | | |
| 17. 2-hydroxyethyl ethyleneimine (HEEI) | | | | | | | |
| resin specifications | | | | | | | |
| a. number average molecular weight | 800 | 4,000 | 20,000 | 800 | 3,000 | 2,000 | 1,800 |
| b. OH value | 315 | 32 | 6.0 | 138 | 28 | 98 | 155 |
| c. average OH number per molecule | 4.5 | 2.3 | 2.0 | 2.0 | 1.5 | 3.5 | 5.0 |
| d. trivalent/tetravalent alcohol (wt %) | 39.9 | 3.0 | 0 | 0 | 0 | 11.9 | 24.6 |
| e. ε-caprolactone (wt %) | 0 | 0 | — | — | — | 50.3 | — |
| characteristics of resin | | | | | | | |
| A. non-volatile content (%) | 65.2 | 65.1 | 40.2 | 70.2 | 70.1 | 65.1 | 65.4 |
| B. viscosity (25° C. Gardner) | UV | $Z_1$ | — | XY | Y-Z | X | $Z_6<$ |
| C. acid value (AV/NV) | 10.0 | 10.0 | 2.0 | 2.0 | 2.0 | 10.0 | 10.0 |

TABLE 2

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| resin formula | | | | | | | | | | | |
| linear type polyester | | | | | | | | | | | |
| resin | A-① | A-② | A-③ | A-④ | A-④ | A-⑤ | A-② | A-③ | A-① | A-② | A-② |
| solid | 50 | 50 | 30 | 30 | 30 | 50 | 90 | 80 | 60 | 40 | 80 |
| branched type polyester | | | | | | | | | | | |
| resin | B-⑥ | B-⑦ | B-⑧ | B-⑨ | B-⑩ | B-⑧ | B-⑪ | B-⑫ | B-⑥ | B-⑦ | B-⑪ |
| solid | 50 | 50 | 70 | 70 | 70 | 50 | 10 | 20 | 40 | 60 | 20 |
| OH value of blend | 56 | 50 | 52 | 65 | 87 | 74 | 63 | 42 | 49 | 52 | 89 |
| methylolated melamine resin (solid) | 30 | 30 | 30 | 30 | 30 | 30 | 15 | 35 | 21 | 15 | |
| butylated melamine (solid) | | | | | | | | | 9 | 15 | |
| MeMF/BuMF (solid) | | | | | | | | | 70/30 | 50/50 | |
| isocyanate (Sumidul N-75) | | | | | | | | | | | 16.7 |
| Test results | | | | | | | | | | | |
| non-volatile content(%) of coating composition | 70.8 | 70.5 | 70.5 | 70.6 | 70.1 | 70.6 | 70.2 | 71.2 | 70.1 | 70.2 | 71.3 |
| gloss | 91.2 | 89.5 | 92.0 | 90.1 | 88.9 | 90.1 | 90.2 | 90.5 | 88.6 | 88.3 | 90.2 |
| pencil hardness | 2H | 2H | 2H | 2H~3H | 3H | 2H | 2H | 3H | 2H | 2H | 2H |
| bending properties | 2T | 2T~3T | 3T | 3T | 3T | 3T | 1T~2T | 3T | 2T | 3T | 2T |
| fastness to boiling water | ◯ | ◯ | ◯ | ◯ | ◯ | ◯ | ◯ | ◯ | ◯ | ◯ | ◯ |
| chemical resistance | ◯ | ◯ | ◯ | ◯ | ◯ | ◯ | ◯ | ◯ | ◯ | ◯ | ◯ |
| marker stain resistance | ◯ | ◯ | ◯ | ◯ | ◯ | ◯ | ◯ | ◯ | ◯ | ◯ | ◯ |
| weather resistance | 82 | 85 | 80 | 82 | 79 | 80 | 80 | 82 | 80 | 81 | 85 |

| | Comp. Example | | | | | | | | |
|---|---|---|---|---|---|---|---|---|---|
| | 1 | 2 | 3 | 4 | 5 | 6 | 7 | 8 | 9 |
| resin formula | | | | | | | | | |
| linear type polyester | | | | | | | | | |
| resin | C-⑬ | C-⑭ | C-⑮ | A-① | A-④ | A-④ | A-③ | | A-④ |
| solid | 40 | 40 | 20 | 80 | 20 | 40 | 100 | | 80 |
| branched type polyester | | | | | | | | | |
| resin | B-⑨ | B-⑧ | B-⑧ | B-⑥ | B-⑩ | C-⑯ | | B-⑦ | C-⑰ |
| solid | 60 | 60 | 80 | 20 | 80 | 60 | | 100 | 20 |
| OH value of blend | 58 | 88 | 50 | 35 | 113 | 84 | 45 | 64 | 81 |
| methylolated melamine resin (solid) | 30 | 30 | 30 | 30 | 30 | 30 | 30 | 30 | 30 |
| butylated melamine (solid) | | | | | | | | | |
| MeMF/BuMF (solid) | | | | | | | | | |
| isocyanate (Sumidul N-75) | | | | | | | | | |

TABLE 2-continued

| Test results | | | | | | | | | |
|---|---|---|---|---|---|---|---|---|---|
| non-volatile content(%) of coating composition | 55.7 | 70.3 | 70.1 | 70.3 | 70.3 | 70.6 | 70.5 | 70.3 | 65.3 |
| gloss | 63.2 | 88.4 | 89.2 | 88.3 | 85.3 | 87.2 | 80.2 | 88.1 | * |
| pencil hardness | B | 2H | 2H | 2H | 2H | HB | 2B | 3H | 2H |
| bending properties | 1T | 6T | 3T | 2T | 6T~7T | 2T | 1T | 10T< | 3T |
| fastness to boiling water | X | X | X | X | ○ | ○ | X | ○ | X |
| chemical resistance | X | ○ | X | X | ○ | ○ | X | ○ | X |
| marker stain resistance | X | ○ | X | X | ○ | ○ | X | ○ | X |
| weather resistance | 62 | 50 | 42 | 43 | 69 | 78 | 45 | 79 | 62 |

*loss in gloss

What is claimed is:

1. A coating composition for coil coating use consisting essentially of
(A) a binder component comprising a mixture of a linear polyester resin and a branched polyester resin, having a hydroxyl value of 40 to 90, said linear polyester resin cmprising (1) a polybasic acid component consisting of (a) aromatic dicarboxylic acid or its anhydride in an amount of 13.7 to 49.2 wt % based on the solids weight of said linear polyester resin, and (b) aliphatic dicarboxylic acid, and (2) a polyhydric alcohol component consisting of (a) at least one member selected from trihydric alcohol and tetrahydric alcohol in an amount of 0 to 10 wt % based on the solids weight of said linear polyester resin, and (b) dihydric alcohol, and having 1.8 to 2.2 hydroxyl groups per molecule and a number average molecular weight of 1000 to 5000, and said branched polyester resin comprising a polybasic acid component and a polyhydric alcohol component consisting of (a) at least one member selected from trihydric alcohol and tetrahydric alcohol in an amount of 3 to 40 wt % based on the solids weight of said branched polyester resin, and (b) dihydric alcohol, and having 2.3 to 4.5 hydroxyl groups per molecule, and
(B) a crosslinking component selected from melamine resin, at least part of which is a methyl methylolated melamine, and isocyanate compound.

2. A composition according to claim 1 wherein the branched polyester resin is modified with a lactone of the formula:

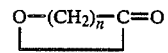

wherein n is an integer of 4 to 10.